SWITCH ARRANGEMENT IN A MULTI-CHANNEL-PULSE-COMMUNICATION-SYSTEM

Filed Feb. 19, 1959 2 Sheets-Sheet 1

INVENTORS
CARL GUNNAR SVALA
ANDERS KARLBY BERGMANN
BY Hane and Nydick
ATTORNEYS

INVENTORS
CARL GUNNAR SVALA
ANDERS KARLBY BERGMANN
BY Hane and Nydick
ATTORNEYS 3,052,760

SWITCH ARRANGEMENT IN A MULTI-CHANNEL-PULSE-COMMUNICATION-SYSTEM

Carl Gunnar Svala, Alvsjo, and Anders Karlby Bergmann, Hagersten, Sweden, assignors to Telefonaktiebolaget L M Ericsson, Stockholm, Sweden, a corporation of Sweden Filed Feb. 19, 1959, Ser. No. 794,457
Claims priority, application Sweden Feb. 25, 1958
4 Claims. (Cl. 179—15)

The present invention refers to a switch arrangement in a multi-channel-pulse-communication-system especially an electronic telephone system, where the signals of the individual connections are sent from a terminal equipment to another as modulated pulses via switches individual to the terminal equipments and a transmission medium common for several connections, which medium contains at least one additional switch.

In electronic telephone systems of the kind, where the signals are transferred through switches, which are continuously closed during the communication time, it is possible to use relatively cheap bistable elements, e.g. glow discharge tubes or semi-conductor elements having a negative interval resistance as switches in the speech paths. The switches, which will be required to set up a speech path through the switching network of the telephone exchange for a certain communication can easily be closed by a voltage or current pulse when setting up the communication, and the switch is opened again at the end of the communication by an impulse in an opposite direction.

In order to save circuit elements attempts have been made for multiplex use of the switches, so that one and the same physical talking channel has been used for several mutual communications within the telephone exchange. Of practical reasons only a time division multiplex transmission system comes in question. The different communication channels are cyclically connected to the speech path with a repetition frequency, which is of the same size as twice the highest voice frequency transmitted maximally. If the number of mutual communications is $n$, each communication will thus be set up only during $1/n$ of the available time. The time intervals, during which the switches in the speech paths are closed during each period, will therefore be of the order of a few micro seconds. These switches must thus be very fast, and they must close and break the currents with a high degree of accuracy in order to prevent crosstalk between the different channels. Up to now diode or transistor switches of a relatively complicated construction have been used for this purpose, and said switches are controlled by current or voltage pulses with carefully defined duration and time position. These switches and pertaining control circuits will, of course, be expensive compared with the cheap bistable contacts, which can be used in telephone systems, where the contacts are continuously closed during the whole communication time. The use of more expensive switches is, however, to a certain extent compensated by the fact that the number of switches can be considerably reduced.

In a known electronic telephone system using the time multiplex principle the incoming lines (for example subscriber lines) are divided into groups, which have about the same number of lines and the same traffic charge. Each line of a group is through an individual switch connected at least to one common conductor, and these conductors are mutually connected through switches for enabling interconnections. Each communication will at this system be set up through several switches connected in series.

It is known, for instance through the U.S. Patent 2,718,621, to arrange a delay line or network in each of the terminal equipments of the connected lines of a pulse communication system close to the individual switch. These delay lines, which have a time delay equal to half the pulse time, provide the transmission of speech energy from one terminal equipment to another by means of a current pulse, the amplitude of which is mainly constant during the pulse time and goes through zero at the end of the pulse time. The time required for transmitting the speech energy, that is the pulse time is quite determined by the delay time of the delay line, which can be made very accurate.

According to the invention it has now proved possible to provide a simple and cheap switch arrangement in a multi-channel-pulse-transmission-system, where the signals of the individual channels are transmitted from one terminal equipment to another as modulated pulses via switches individual to the terminal equipments and a transmission medium common to several channels, said medium containing at least one further switch, said switches being synchronously closed during the pulse time allotted to the channel and where each terminal equipment nearest the individual switch comprises a delay line having a substantially real impedance during the pulse time, the signal energy, which is stored in the one delay line during the interval between two pulses being during the pulse transmitted to the delay line of another terminal equipment as a current pulse, the amplitude of which is mainly constant during the pulse time and goes through zero at the end of the pulse time. The invention is characterized by at least one of the individual switches being made as a bistable, current controlled switch, having a high resistance for switch currents during a certain value and a low resistance for switch currents above this value, means being provided to apply a further control pulse to the bistable switch for closing the switch, the switch being kept closed by the current, passing therethrough during the pulse time, until said current at the end of the pulse time decreases below said value, and the switch is opened, and by the other switches being arranged to be opened as well as closed by a separate control signal.

In the switch arrangement according to the invention it is possible to use cheap, bistable elements in the individual switches and the devices for operating the switches will be relatively simple, as only the closing of the switches must be made with any greater precision. The opening of the switches at the end of the pulse time is effected by the pulses themselves, the amplitude of which is effectively reduced under the lowest value which can keep the switch closed owing to the circuits pertaining to the terminal equipment. Nor the other switches included in the connection need to be closed and opened with any greater precision. It is only essential that the switches are closed and opened, respectively, within the time channel allotted to the connection in question. The reason why said other switches are opened as well as closed by means of an outer control voltage is that any communication should be prevented from remaining after the end of the pulse time.

The invention will be described in more detail in connection to the attached drawings, where FIG. 1 schematically shows a pulse transmission system according to the invention.

Figures 1, 2, 3, 4:
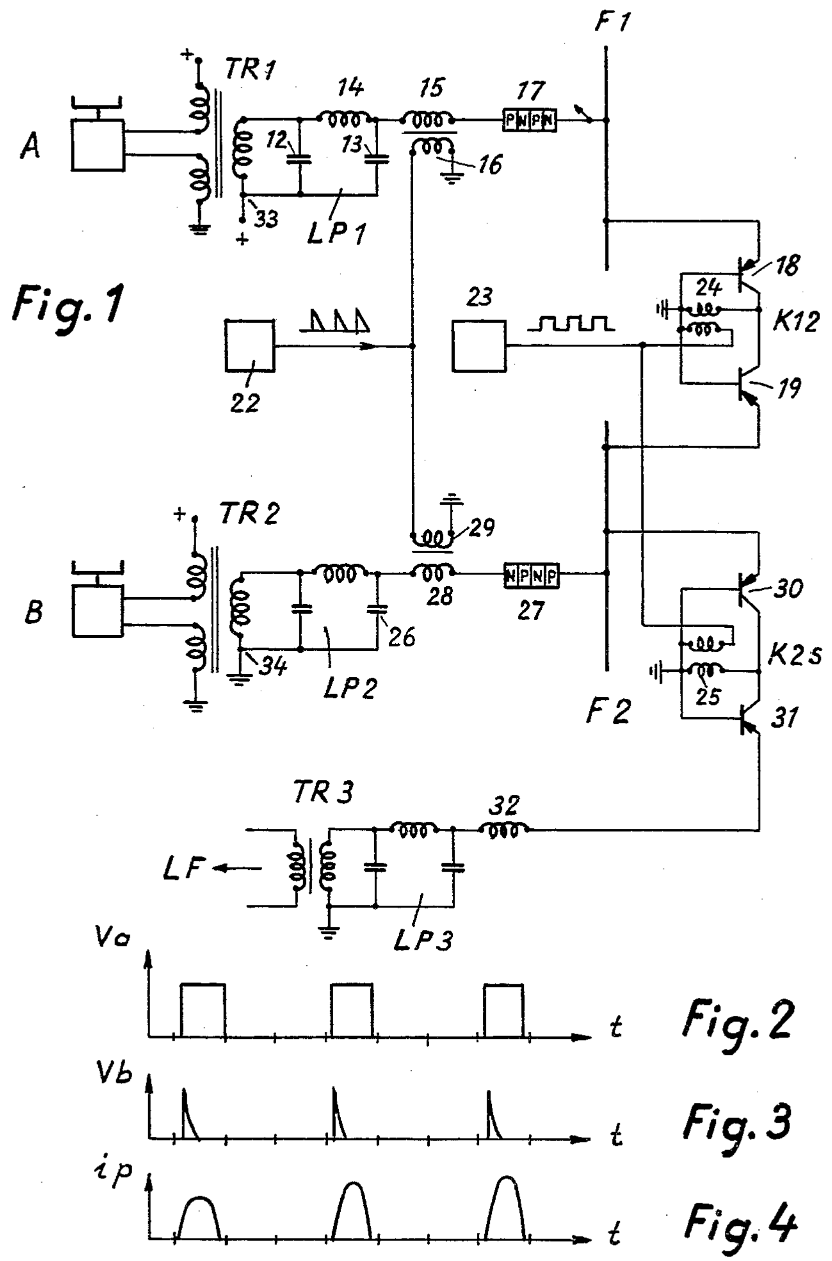
FIGS. 2–4 show currents and voltages in different points of the pulse transmission system according to FIG. 1.

In FIG. 1 the reference A designates a subscriber, who is connected to the primary winding of a line transformer Tr1 through his subscriber line. The secondary winding of this transformer is connected to one terminal pair of a low pass filter LP1. One terminal of the other terminal pair is connected to a coil 15, which is so dimensioned that it together with the terminating condenser 13 of the pi-type low pass filter LP1 is forming a tuned circuit, the period of which is mainly equal to twice the pulse time. The coil 15 and the condenser 13 are to be considered as a very simplified delay line and they can, of course, be replaced by more complicated delay devices according to the principles, which are disclosed in the above mentioned U.S. Patent 2,718,621. The coil 15 is provided with an additional winding 16, which is connected to a pulse source 22.

The coil 15 is connected to a conductor F1 common to several subscribers in series with a current controlled bistable switch 17. The bistable switches shown in FIG. 1 are so called pnpn-diodes or four-layer-diodes of the kind, which is described in Proc. IRE, vol. 44, p. 1174, September 1956. The resistance of such a diode is of the magnitude 10 to 100 megohms for currents below a certain value but only of the magnitude 3–30 ohms for currents above said value, that is it is a very effective, current controlled switch. The conductor F1 is through the previously known switch K12 including two transistors 18, 19 connected to another common conductor F2, to which a further group of lines including the subscriber B is connected. The switch K12, which in the idle state is open, is controlled by the rectangular pulses, which are obtained from a pulse source 23, and it remains closed only as long as the pulses continue. The subscriber B is provided with a subscriber equipment including a low pass filter LP2, a coil 28 and a bistable switch 27 of the same kind as the subscriber A.

The conductor F2 is further connected to a low frequency equipment for instance included in a register through a contact K2*s* consisting of two transistors 30 and 31. This equipment consists of a coil 32, a low pass filter LP3 and a transformer TR3. Also the contact K2*s* is controlled by rectangular pulses from the pulse source 23.

The device according to FIG. 1 operates in the following way: Suppose first that the subscriber A is connected to the subscriber B and that this connection has been alotted to a pulse channel, which in FIGS. 2–4 has been designated by I. These figures only show three pulse channels during each repetition period, but in practice the number of pulse channels is considerably larger. The windings 16 and 29 will thus receive control pulses according to FIG. 3 from the pulse source 22, while the switch K12 will receive control pulses according to FIG. 2 from the pulse source 23. All these control pulses appear in the pulse position 1.

If for instance the subscriber A is considered, the condenser 13 will be charged by the speech current to a level, which corresponds to the instantaneous amplitude of the speech wave during the interval between the pulses, and as the switch 17 during the interval between the pulses has a very high resistance, the charge cannot pass said switch. The pulses according to FIG. 3, which at the beginning of the pulse position 1 are applied to the windings 16 and 29, cause the voltages across the switches 17 and 27 to exceed the level, where the current will be high enough to transfer the switch to the low resistance state. At the same time or somewhat before the closure of the switches 17 and 27 the switch K12 is also closed by means of the control pulses shown in FIG. 2 from the pulse source 23. A circuit having a comparatively low resistance is now closed between A and B through the switch 17, the conductor F1, the switch K12, the conductor F2 and the switch 27. The signal energy stored in the condenser 13 is now beginning to be transmitted to the condenser 26 in the tuned circuit formed by the condenser 12, the coils 15 and 28 and the condenser 26. As this tuned circuit has a period, which is equal to twice the duration of the desired pulse, the current will pass through zero at the end of the pulse time and the switches 17 and 27 are opened. At the same time or possibly somewhat later the switches K12 and K23 are also opened. The signal energy transmitted to the condenser 26 propagates during the pulse pause through the low pass filter LP2 to the subscriber's station B. The signal energy coming from B propagates, of course, in the corresponding way to A.

In order to prevent the switches 17 and 27 from opening when the speech A.C. current passes through zero from a positive to a negative half wave it is necessary to superpose the speech current on carrier pulses of such a magnitude that the current through the switches 17 and 27 cannot be decreased below the critical value where the switch breaks any time during the duration of the pulse. These carrier pulses can be obtained according to FIG. 1 by connecting the common point 33 in the low pass filter LP1 to a higher potential (+) than the corresponding point (34) in the low pass filter LP2 of the subscriber B. Each time the contact system between A and B is closed, a D.C. pulse will therefore be transmitted from A to B, which pulse is modulated with the speech signal. In spite of the carrier pulses being unilateral from A to B it is possible to speak in both directions. The speech signal of B is namely charging the condenser 26, and this charge is added to or subtracted from the charge, which is to be transmitted from A, so that the charging current increases or decreases. According to the superposition principle A is sensing this current increase or decrease on the low frequency side as transmission of a signal from B to A.

At the bottom of FIG. 1 a low frequency circuit is shown, which for instance forms the input to a register for receiving voice frequency selecting impulses. This circuit is connected to the conductor F2 through the switch K2*s* of the same kind as the switch K12 comprising two transistors 30 and 31. The circuit is shaped in the same way as the subscriber circuits and it includes a coil 32, a capacitively terminated low pass filter LP3 and a transformer Tr3. If, for instance, a voice frequency selecting signal is to be transmitted from the subscriber A to a register, in the input of which said circuit is connected, the switches 17, K12 and K2*s* are actuated. The switch K2*s* is controlled by the same pulses, which control the switch K12.

As is shown in FIG. 1 the demand of carrier pulses involves that the two lines taking part in the connection must have different potential levels. This is a considerable disadvantage, which, however, can be avoided in different ways.

One solution is that all subscribers have the same potential level but that all connections pass through low frequency circuits of the kind, which is shown at the bottom of FIG. 1, said low frequency circuits having a potential level separated from the subscriber circuits. The pulses from the A-subscriber are demodulated in a low frequency circuit connected to the conductor F1, so that the low frequency signal (LF) is restored and this low frequency signal is applied again to a pulse circuit corresponding to LP3, 32, which is connected to the common conductor F2 of the B-subscriber. The transmission of the signal from the low frequency circuit to the B-subscriber may possibly occur in another pulse position than the transmission of the signal between the A-subscriber and the low frequency circuit.

Figure 5:
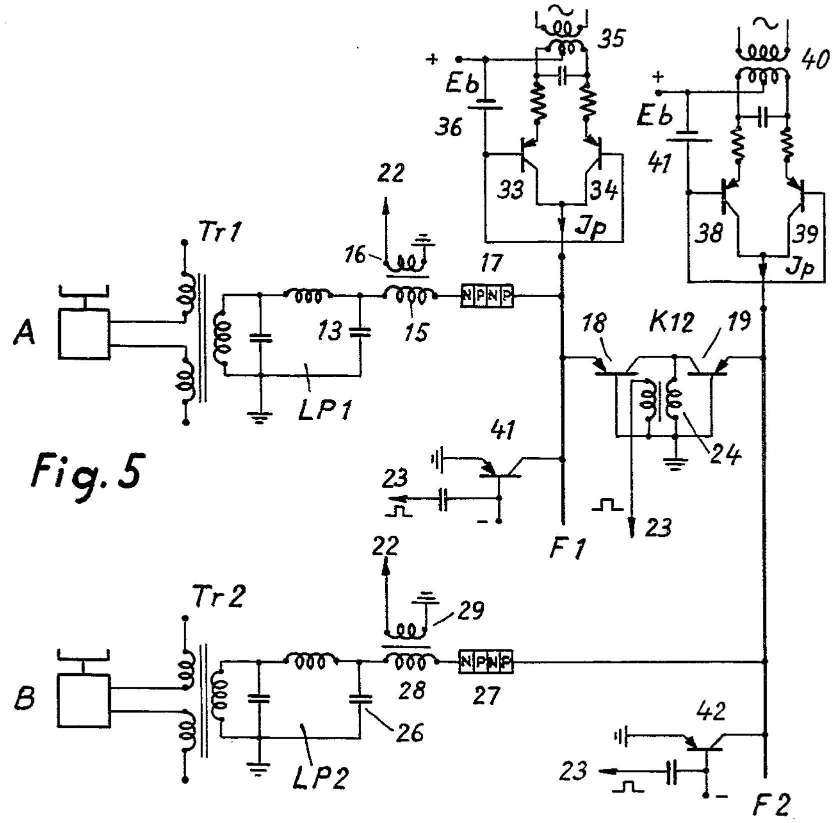
FIG. 5 shows another embodiment of the invention.

Another way to solve the problem with carrier pulse transmission is shown in FIG. 5. In this figure the details, which are identical to the corresponding details in FIG. 1 have been provided with the same reference notations.

Figure 6:
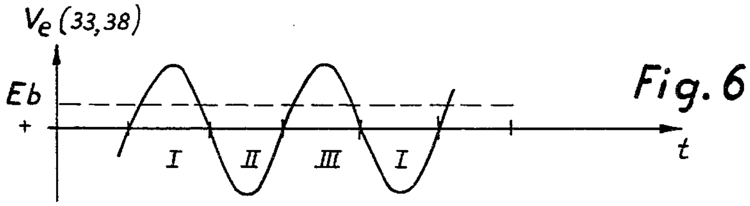
FIGS. 6–7 show voltages and currents in the device according to FIG. 5.

A pulse source with a high internal impedance for signals is connected to each of the conductors F1 resp. F2 common to a group of lines. These pulse sources generate substantially half sinusoidal current pulses corresponding to the carrier pulses, which in FIG. 1 are transmitted from the A-subscriber to the B-subscriber. Each pulse source consists of two push-pull connected transistors 33, 34 and 38, 39 respectively, the collector electrodes of which are interconnected and coupled to the conductors F1 and F2 respectively. The emitter electrodes of the transistors are connected through series resistances to the secondary winding of a transformer 35 and 40 respectively. The secondary windings are provided with center tappings, which are connected to a potential, which is positive compared with the ground potential. The base electrodes of the transistors 33, 34 and 38, 39 respectively get from the batteries 36, 37 respectively a bias, which is positive in relation to the emitter electrodes. The primary windings of the transformers 35 and 40 respectively are connected to an alternating voltage source, the period of which is twice the whole channel width, and it has such a phase that the zero passage is located in the transition between two adjacent channels, as is shown in FIG. 6. The push-pull connected transistors 33, 34 and 38, 39 respectively operate as full-wave rectifiers, where each transistor is conducting during half a period. Owing to the negative bias of the emitter electrodes in relation to the base electrodes, the transistors are, however, not conducting until the time when the A.C. voltage of the emitter overcomes the bias E*b*. This time corresponds to the time when the control pulses arise for closing the contacts 17 and 27. The transistors 33, 34 and 38, 39 respectively will then be cut off at the time when these switches are to be opened again. The current pulses, which are obtained from the carrier pulse generators are of course not pure half sinusoidal waves, but the approximation has, however, no practical importance. The common points 33 and 34 in the low pass filter LP1 and LP2 are grounded.

In order to prevent the carrier pulses from appearing on the common conductors in other pulse positions than those occupied by communications to lines in the group in question, and in order to obtain an effective discharge of the conductors F1 resp. F2 between the pulses, said conductors are connected to ground through a normally closed transistor switch 41 and 42 respectively. These two switches are opened by the same pulses, which close the switch K12, which is connected between the conductors in question.

The circuit according to FIG. 5 operates in the following way during a communication between a subscriber A and a subscriber B, supposing that the connection has been allotted pulse channel I.

Figure 7:
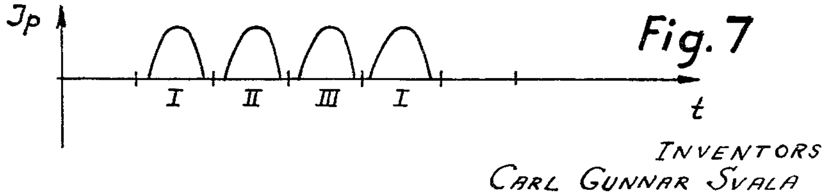

In the pause between two pulse positions I the condensers 13 and 28 are as is described above charged to amplitude values, which correspond to the amplitude of the speech signals. During the pulse position 1 the switch K12 is closed and the short-circuiting switches 41 and 42 are opened by the control pulses from the pulse source 23. Immediately thereafter the bistable switches 17 and 27 are closed at the same time as the transistors 33 and 38 respectively are made conductive. A current pulse as shown in FIG. 7 will therefore be transmitted through the transistor 33, the contact 17 and the coil 15 to the condenser 13 and a corresponding current pulse is transmitted through the transistor 38, the contact 27 and the coil 28 to the condenser 26. The signal energy stored in the condensers 13 and 26 respectively will be transmitted between these condensers through the coils 15 and 28 and the switches 17, 27 and K12. The pulse sources consisting of the transistors 33, 34 and 38, 39 repectively have a high impedance for the signal and are therefore attenuating the signals very little. The switches 17 and 27 will therefore transfer carrier pulses according to FIG. 7 modulated with speech signals. The current amplitude of the carrier pulses is, as in the device according to FIG. 1, so great that the current through the switches 17 and 27 never decreases to value, where the switch is, during the pulse time.

When the A.C. emitter voltage of the transistors 33 and 38 decreases below the voltage E*b* at the end of the pulse time, the current I*p* and therewith the carrier pulse ceases and the switches 17 and 27 respectively are opened. In this moment the exchange of the charge derived from the transmission signals and stored in the condensers 13 and 26 has been concluded and about at the same time also the control pulse from the pulse source ceases, so that the switch K12 between the conductors F1 and F2 are opened, and the short-circuit switches 41 and 42 are closed for returning possible rest charges of the respective conductors F1 and F2 to ground.

The charge which the carrier pulses transfer to the condensers 13 and 23 respectively, is flowing as a direct current through the low pass filter during the intervals between successive pulses and therefore the carrier pulses themselves do not cause any signal to the subscriber line. The modulation of the carrier pulses caused by the speech signal causes, however, an alternating current component, which after the passage through the low pass filters and the line transformers is transmitted to the subscriber.

Besides the advantage of having the same D.C. voltage level in all circuits the device shown in FIG. 5 has another advantage namely that the switches, for instance K12, between the common conductors need not to be dimensioned for transmission of the carrier pulse power.

It is, of course, possible to modify the described embodiments in a great number of ways within the scope of the invention. It is for instance not necessary that the bistable switches consist of pnpn-diodes, but they can be of any other kind of bistable elements or circuits, for instance so called avalanche transistors.

We claim:

1. A multi-channel pulse-transmission system for transferring signals in the form of modulated current pulses from one terminal equipment to another terminal equipment through individual connections, said system comprising an electronic switch for each said terminal equipment, transmission means common to several connections and connected between said electronic switches, a time delay network for each said terminal equipment having a real impedance so as to store signal energy in the time interval between pulses and transfer said energy during the pulse time as a current pulse to the other said time delay network associated with the other terminal equipment in the same connection, at least one of said electronic switches comprising a bistable current-controlled element having a high resistance to passing currents below a predetermined value and a low resistance to passing currents above said value so as to allow closing of said switch by an external short control pulse above said predetermined current value, means for supplying to said bistable element switch a carrier pulse of a length equal to that of the pulse time so that the said bistable element switch reopens at the end of said carrier pulse upon the current passing therethrough becoming zero, each said electronic switch being synchronously closed during the pulse time allotted to the respective connection, whereby the said signals are transferred superposed upon the said carrier pulses at least during passage through said bistable element switch, said carrier pulse thus preventing a decrease of the current through said bistable switch below the said value at which said switch has high resistance.

2. A transmission system according to claim 1 wherein the time delay networks of the two terminal equipments participate in a connection having different D.C. high voltage levels.

3. A transmission system according to claim 1 wherein said common transmission means comprises a plurality of conductors, a group of terminal equipments, and a plurality of bistable current controlled switches connecting each of said conductors to said group of terminal equipment, and comprising carrier pulse generators connected to said conductors, said generators feeding the carrier pulses through said bistable current controlled switches to the time delay networks of the terminal equipments connected to the conductors for the respective connection.

4. A transmission system according to claim 1 wherein each of said time delay networks comprises an inductance means connected between said individual bistable switch and a low pass filter means included in the respective terminal equipment and a shunt capacitance means formed by part of said filter means and turned against said inductance means, and a winding inductively coupled with said inductance means for feeding said control pulse to said bistable individual switch.

References Cited in the file of this patent

UNITED STATES PATENTS

| | | |
|---|---|---|
| 2,691,073 | Lowman | Oct. 5, 1954 |
| 2,892,035 | Trousdale | June 23, 1959 |
| 2,901,603 | Weill et al. | Aug. 25, 1959 |
| 2,980,769 | Lawsine | Apr. 18, 1961 |